US008909416B2

(12) United States Patent  (10) Patent No.: US 8,909,416 B2
Chen et al.  (45) Date of Patent: Dec. 9, 2014

(54) HANDHELD SCAN TOOL WITH FIXED SOLUTION CAPABILITY

(75) Inventors: Ieon C. Chen, Laguna Hills, CA (US); Robert Madison, Eastvale, CA (US); Keith Andreasen, Garden Grove, CA (US)

(73) Assignee: Innova Electronics, Inc., Irvine, CA (US)

( * ) Notice: Subject to any disclaimer, the term of this patent is extended or adjusted under 35 U.S.C. 154(b) by 0 days.

(21) Appl. No.: 13/567,745

(22) Filed: Aug. 6, 2012

(65) Prior Publication Data

US 2013/0204485 A1  Aug. 8, 2013

Related U.S. Application Data

(63) Continuation-in-part of application No. 12/082,581, filed on Apr. 14, 2008, now abandoned.

(51) Int. Cl.
*G01M 17/00* (2006.01)
*G06F 17/00* (2006.01)
*G07C 5/08* (2006.01)
*G07C 5/00* (2006.01)

(52) U.S. Cl.
CPC .............. *G06F 17/00* (2013.01); *G07C 5/008* (2013.01); *G07C 5/0808* (2013.01); *G07C 2205/02* (2013.01)
USPC ........................................ 701/33.3; 701/34.4

(58) Field of Classification Search
CPC ...... G07C 5/008; G07C 5/0808; G06F 17/00; G06F 17/76; G01M 17/013
USPC .......... 701/29.1, 29.6, 31.4, 33.4, 29.3, 31.6, 701/31.7, 31.8, 33.2, 33.7, 33.8, 33.9; 702/183, 185
See application file for complete search history.

(56) References Cited

U.S. PATENT DOCUMENTS

| | | | |
|---|---|---|---|
| 4,859,932 A | 8/1989 | Whitley | |
| D334,560 S | 4/1993 | Wilson | |
| 5,345,384 A * | 9/1994 | Przybyla et al. | ............. 701/29.1 |
| 5,347,211 A | 9/1994 | Jakubowski | |
| 5,400,018 A | 3/1995 | Scholl et al. | |
| 5,491,631 A * | 2/1996 | Shirane et al. | ............... 701/29.6 |
| D377,622 S | 1/1997 | Chen | |
| 5,631,831 A | 5/1997 | Bird et al. | |

(Continued)

OTHER PUBLICATIONS

ACTRON, Scan Tools, Autoscanner Plus CP9580, Dec. 21, 2011, www.actron.com/product_detail.php?pid=16364.

*Primary Examiner* — Karen Beck
(74) *Attorney, Agent, or Firm* — Stetina Brunda Garred & Brucker

(57) ABSTRACT

A diagnostic scan tool is provided including a connect/configure module for establishing a communication link between the scan tool and a vehicle electronic control unit (ECU). A vehicle specification module operates to identify a vehicle under test in response to receipt of a vehicle identification number (VIN). A trouble code module receives digital trouble codes (DTCs) from the ECU. A freeze frame data module retrieves freeze frame data from the ECU, the retrieved freeze frame data being functionally associated with a highest priority DTC. A database lists possible vehicle defect solutions, indexed to the VIN and the DTCs. A digital signal processor is operative to derive the highest priority DTC from analysis of the retrieved freeze frame data. The digital signal processor further being operative to regulate selection of a most likely vehicle defect solution associated with the VIN and the highest priority DTC.

33 Claims, 4 Drawing Sheets

(56) References Cited

U.S. PATENT DOCUMENTS

| | | | |
|---|---|---|---|
| 5,635,841 A | 6/1997 | Taylor | |
| 5,657,233 A | 8/1997 | Cherrington et al. | |
| 5,767,681 A | 6/1998 | Huang | |
| 5,916,286 A | 6/1999 | Seashore et al. | |
| 5,935,180 A | 8/1999 | Fieramosca et al. | |
| 6,000,413 A | 12/1999 | Chen | |
| 6,141,608 A * | 10/2000 | Rother | 701/29.6 |
| 6,169,943 B1 | 1/2001 | Simon et al. | |
| 6,225,898 B1 | 5/2001 | Kamiya et al. | |
| 6,263,322 B1 | 7/2001 | Kirkevold et al. | |
| 6,314,422 B1 * | 11/2001 | Barker et al. | 715/205 |
| 6,389,337 B1 | 5/2002 | Kolls | |
| 6,473,659 B1 | 10/2002 | Shah et al. | |
| 6,499,385 B2 | 12/2002 | Protti | |
| 6,636,790 B1 | 10/2003 | Lightner et al. | |
| 6,732,031 B1 | 5/2004 | Lightner et al. | |
| 6,738,696 B2 * | 5/2004 | Oi | 701/29.6 |
| 6,836,708 B2 | 12/2004 | Tripathi | |
| 6,868,369 B2 | 3/2005 | Huang | |
| 6,925,368 B2 * | 8/2005 | Funkhouser et al. | 701/31.5 |
| 6,940,270 B2 | 9/2005 | Chen | |
| D510,287 S | 10/2005 | Chen | |
| 6,957,133 B1 | 10/2005 | Hunt et al. | |
| 6,968,733 B2 | 11/2005 | Andreasen | |
| 7,030,742 B2 | 4/2006 | Treadway | |
| 7,085,680 B2 | 8/2006 | Huang | |
| 7,116,216 B2 | 10/2006 | Andreasen | |
| 7,164,760 B2 | 1/2007 | Krause | |
| 7,209,813 B2 | 4/2007 | Namaky | |
| 7,209,860 B2 * | 4/2007 | Trsar et al. | 702/183 |
| RE39,619 E | 5/2007 | Andreasen | |
| D545,223 S | 6/2007 | Chen | |
| D558,621 S | 1/2008 | Rich | |
| D559,137 S | 1/2008 | Protti | |
| D560,129 S | 1/2008 | Rich | |
| D560,527 S | 1/2008 | Rich | |
| 7,325,775 B2 | 2/2008 | Chen | |
| D563,249 S | 3/2008 | Chen | |
| D569,280 S | 5/2008 | Chen | |
| 7,376,497 B2 | 5/2008 | Chen | |
| D571,241 S | 6/2008 | Andreasen | |
| 7,437,227 B2 | 10/2008 | Andreasen | |
| D581,822 S | 12/2008 | Madison | |
| 7,464,000 B2 | 12/2008 | Huang | |
| D590,387 S | 4/2009 | Chen | |
| 7,520,668 B2 | 4/2009 | Chen | |
| RE40,798 E | 6/2009 | Chen | |
| RE40,799 E | 6/2009 | Chen | |
| 7,590,476 B2 | 9/2009 | Shumate | |
| 7,603,293 B2 | 10/2009 | Chen | |
| 7,613,975 B2 * | 11/2009 | Jibry et al. | 714/746 |
| D610,586 S | 2/2010 | Chen | |
| 7,684,908 B1 | 3/2010 | Ogilvie et al. | |
| 7,734,390 B2 | 6/2010 | Chen | |
| 7,751,953 B2 | 7/2010 | Namaky | |
| D624,446 S | 9/2010 | Chen | |
| D624,838 S | 10/2010 | Chen | |
| D625,209 S | 10/2010 | Chen | |
| D625,210 S | 10/2010 | Chen | |
| D625,634 S | 10/2010 | Chen | |
| 7,809,481 B2 | 10/2010 | Okada et al. | |
| 7,974,750 B2 | 7/2011 | Namaky | |
| 8,019,503 B2 | 9/2011 | Andreasen | |
| 8,024,083 B2 | 9/2011 | Chen | |
| D646,188 S | 10/2011 | Chen | |
| D646,599 S | 10/2011 | Chen | |
| 8,032,419 B2 | 10/2011 | Chen | |
| 8,068,951 B2 * | 11/2011 | Chen et al. | 701/31.4 |
| 8,098,140 B1 | 1/2012 | Escobosa et al. | |
| 8,234,035 B2 * | 7/2012 | Iwagami et al. | 701/30.5 |
| 8,301,329 B2 | 10/2012 | Andreasen | |
| 8,494,810 B2 * | 7/2013 | Goldfine et al. | 702/183 |
| 2002/0007237 A1 | 1/2002 | Phung et al. | |
| 2002/0077781 A1 * | 6/2002 | Liebl et al. | 702/183 |
| 2002/0128985 A1 | 9/2002 | Greenwald | |
| 2003/0171111 A1 | 9/2003 | Clark | |
| 2003/0177417 A1 | 9/2003 | Malhotra et al. | |
| 2004/0016804 A1 * | 1/2004 | Namaky et al. | 235/435 |
| 2004/0044454 A1 | 3/2004 | Ross et al. | |
| 2004/0064225 A1 | 4/2004 | Jammu et al. | |
| 2004/0088087 A1 * | 5/2004 | Fukushima et al. | 701/32 |
| 2004/0172177 A1 | 9/2004 | Nagai et al. | |
| 2004/0227523 A1 | 11/2004 | Namaky | |
| 2004/0255261 A1 * | 12/2004 | Kanno | 717/100 |
| 2005/0033664 A1 | 2/2005 | Moon et al. | |
| 2005/0043869 A1 * | 2/2005 | Funkhouser et al. | 701/29 |
| 2005/0060070 A1 | 3/2005 | Kapolka et al. | |
| 2005/0143882 A1 | 6/2005 | Umezawa | |
| 2006/0089767 A1 * | 4/2006 | Sowa | 701/29 |
| 2006/0095230 A1 * | 5/2006 | Grier et al. | 702/183 |
| 2006/0101311 A1 | 5/2006 | Lipscomb | |
| 2006/0161313 A1 | 7/2006 | Rogers et al. | |
| 2006/0161390 A1 | 7/2006 | Namaky et al. | |
| 2006/0238320 A1 | 10/2006 | Veliu et al. | |
| 2006/0247978 A1 | 11/2006 | Davis | |
| 2007/0250231 A1 | 10/2007 | Tefft et al. | |
| 2007/0294000 A1 * | 12/2007 | Underdal et al. | 701/29 |
| 2007/0294001 A1 * | 12/2007 | Underdal et al. | 701/29 |
| 2008/0119981 A1 | 5/2008 | Chen | |
| 2008/0177438 A1 * | 7/2008 | Chen et al. | 701/33 |
| 2009/0055045 A1 | 2/2009 | Biswas et al. | |
| 2009/0099888 A1 * | 4/2009 | Nelson | 705/7 |
| 2009/0150218 A1 | 6/2009 | Brunner et al. | |
| 2009/0276115 A1 | 11/2009 | Chen | |
| 2010/0124913 A1 | 5/2010 | Cox | |
| 2010/0174446 A1 | 7/2010 | Andreasen | |
| 2010/0174661 A1 | 7/2010 | Kashoun et al. | |
| 2010/0210254 A1 | 8/2010 | Kelly et al. | |
| 2011/0071724 A1 | 3/2011 | Heine et al. | |
| 2011/0112932 A1 | 5/2011 | Chen | |
| 2011/0224866 A1 * | 9/2011 | Chen | 701/33 |
| 2011/0238506 A1 | 9/2011 | Perkowski et al. | |
| 2011/0246018 A1 | 10/2011 | Bertosa et al. | |
| 2011/0264322 A1 | 10/2011 | Chen | |
| 2012/0010775 A1 | 1/2012 | Chen | |
| 2012/0215398 A1 * | 8/2012 | Chen et al. | 701/31.6 |
| 2013/0116881 A1 * | 5/2013 | Bogema et al. | 701/29.2 |
| 2013/0297143 A1 * | 11/2013 | Chen et al. | 701/29.6 |
| 2013/0317694 A1 * | 11/2013 | Merg et al. | 701/31.6 |

\* cited by examiner

HANDHELD SCAN TOOL WITH FIXED SOLUTION CAPABILITY

CROSS-REFERENCE TO RELATED APPLICATIONS

This application is a continuation-in-part of U.S. patent application Ser. No. 12/082,581, filed on Apr. 14, 2008, now abandoned the contents of which are also incorporated herein by reference.

STATEMENT RE: FEDERALLY SPONSORED RESEARCH/DEVELOPMENT

Not Applicable

BACKGROUND

The present invention relates generally to vehicle diagnostic systems and methods, and, more particularly, to diagnostic scan tools operative to access diagnostic information from a vehicle electronic control unit (ECU), and to derive a most likely vehicle solution therefrom.

An On-Board Diagnostic, or OBD, system is a computer-based system that was developed by automobile manufacturers to monitor the performance of various components on an automobile's engine, including emission controls. Modern vehicles typically have a vehicle diagnostic system, including one or more modules. Examples of such computer control modules (also known as just "modules") are: a power train control module (PCM), an engine control module (ECM), a transmission control module (TCM), an ABS control module and an air bag control module. Upon detection of any malfunction, the OBD system provides the owner of the automobile with an early warning indicator (such as illuminating the check engine light in the dashboard of automobile).

Contemporary ECU's are operative to monitor the operating conditions of various onboard systems and electrical devices to identify and report any defective conditions. Such ECU's have become increasingly sophisticated in their ability to store data related to various defects and to communicate such information to diagnostic tools in communication with the ECU.

OBD was primarily introduced to meet EPA emission standards but through the years, OBD systems have become more sophisticated. For example, in the mid 1990's OBD 2, Standard Edition was implemented in light-duty cars and trucks. OBD 2 provides a plurality of sensors to monitor malfunctions in the engine, chassis, body, and accessory devices. In a simple scenario, the OBD system detects a malfunction in the engine (or any other component that is monitored by sensors of the OBD system) and signals a warning indicative of such a malfunction. For example, a check engine light could be illuminated in an automobile's dashboard indicative of such malfunction. The automobile's owner, upon noticing such a warning indicator, can make plans for taking the automobile to a service station where the malfunction can be further investigated.

Upon arrival at the service station, a repair personnel can connect a cable that serves as a communications link between the automobile's diagnostic port and computing device (such as a code reader, scan tool or laptop). Once connected, the computing device decodes OBD 2 system signals (such as diagnostic trouble codes [DTC] received via the diagnostic port), and presents them to the service station personnel who can then make a decision respecting how to fix the malfunction.

Off-board devices, such as portable code reader/scan tools have been marketed for retrieving and interpreting vehicle diagnostic data. Code readers are generally more simple devices which only scan and display the problem diagnostic codes. More expensive scan tools would have to be used to retrieve live data and perform live tests on the automotive system. The more recent handheld test devices have added circuits for testing systems such the charging system and scanning circuitry wherein live data can be requested for and received.

Scan tool and code readers are governed by a number of standards, e.g. SAE J1978 Rev. 1998-02 and SAE J1979 Rev. 1997-09. Compared to code readers, scan tools are relatively expensive diagnostic devices that have a larger number of features.

There are different types of scan tools. An "OBD 2 Scan Tool" complies with the above-identified specifications. By contrast, a "Manufacturer-Specific Scan Tool" is a scan tool that accesses and displays proprietary manufacturer-specific data (and may also access and display OBD 2 data).

Examples of such manufacturer specific data includes Device Controls on General Motors vehicles; On-Demand Tests in Ford vehicles; and Actuator Tests, Sensor Tests, Interrogator, and Read Temporary Codes in Chrysler vehicles. In general, air bag data, ABS data, cruise control data, and climate control data are also considered to be proprietary manufacturer-specific data and are typically accessible only by Manufacturer-Specific Scan Tools.

In contrast with a scan tool, a code reader is a relatively basic off-board device that links with one or more computer modules in a vehicle diagnostic system via a vehicle computer network, reads any diagnostic trouble codes (referred to as "diagnostic codes" herein) generated by the vehicle diagnostic system and displays any diagnostic codes on a display. Typical code readers do not perform the following major functions that are performed by typical scan tools: "View Data," also known as "Live Data," "Freeze Frame Data," and "Data Test, DTC", collectively referred to as "freeze frame data" (viewing and displaying data, such as captured fixed data and real-time live, changing data from a plurality of module sensors), display of textual diagnostic descriptions corresponding to the various diagnostic codes, recording and playback of data, device control (manually controlling modules for diagnostic purposes), and reading and displaying vehicle information from the vehicle's computer (e.g. VIN information, controller calibration identification number, etc.). The data typically includes values (e.g. volts, rpm, temperature, speed, etc.) and system status information (e.g. open loop, closed, fuel system status, etc.) generated by the vehicle sensors, switches and actuators. (Digital Can OBD 2 Scan Tool Manual p. 40).

Currently, companies such as Innova Electronics Corporation have combined the scan tool and code reader into a single handheld devices, such as the Enhanced OBD 2 Scan Tool. The Enhanced OBD 2 Scan Tool by Innova Corp. is typical of scan tools wherein the problem diagnostic trouble codes (DTCs) are displayed. All of the live data may also be displayed. However, the live data can amount to several hundred readings which a user may need to scan through in order to receive the problem readings.

Due to the increasing complexity of vehicle electrical systems and components, many of which are made by companies other than the manufacturer and utilize different operating protocols, sorting and evaluating the available vehicle information can be a daunting task. Aftermarket scan tools face the challenge of being able to access and process information not only from the ECU, but also from various associated electrical devices. Moreover, given the inter-relatedness of vehicle electrical systems and onboard devices, defects in relation to one onboard electrical device may be reflected in other electrical devices, resulting in multiply digital trouble codes, the ultimate cause of which may be yet another device or circuit that does not directly correspond to any of the digital trouble codes identified in the ECU. The inherent complexity of such systems is compounded by the number of different makes and models of vehicles that are available, and the changes to those vehicles over the years that they are offered. For aftermarket scan tools to have a practical value to ordinary consumers, the scan tools must be relatively inexpensive and typically constructed as a handheld device that is simple to operate.

The numerous challenges to the development of such consumer friendly scan tools have encouraged scan tool manufacturers to consistently seek new ways for accessing, interpreting, processing vehicle diagnostic data, to accurately identify vehicle defects and to derive reliable solutions thereto.

As described below, one implementation of the present invention is directed to a scan tool, and method of the scan tool operation, which leverages the capabilities of contemporary ECUs to derive and process certain diagnostic data, in conjunction with indexed databases that enhance the ability to communicate with the onboard electrical devices and the processing of data derived therefrom.

Another implementation of the present invention utilizes historical information respecting the operation of vehicle systems and electrical devices as a further basis to identify and evaluate vehicle defects and the most likely solutions therefore.

These and other objects and advantages associated with the present invention are described in more detail below, in conjunction with the appended drawings and claims.

BRIEF SUMMARY OF THE INVENTION

A diagnostic scan tool is provided including an input port configured to be engageable to, or otherwise in communication with a vehicle diagnostic port. A connect/configure module may be provided for establishing a communication link between the scan tool and a vehicle electronic control unit (ECU). The connect/configure module may also be operative to poll the ECU to determine a proper connect protocol. Using that protocol the connect/configure module can operate to retrieve the vehicle identification number (VIN) from the ECU. Alternatively, the VIN may be input by a user or scanned from the vehicle.

A vehicle specification module is operative to identify a vehicle under test in response to receipt of the VIN. The vehicle specification module may also be operative to identify communication protocols between the ECU and a plurality of vehicle onboard devices. A trouble code module receives DTC's from the ECU. A freeze frame data module is provided for retrieving freeze frame data from the ECU, the retrieved freeze frame data being representative of the operation of the vehicle onboard device(s) related to the highest priority DTC. A database includes a list of possible vehicle defect solutions, indexed to the VIN and the DTCs. A digital signal processor is provided to derive the highest priority DTC from the freeze frame data, and to regulate selection of a most likely vehicle defect solution associated with the VIN, and the highest priority DTC.

The digital signal processor may be further operative to compare the retrieved freeze frame data to stored freeze frame data corresponding to the highest priority DTC, to identify any anomaly(s) therebetween. The digital signal processor may then regulate selection of the most likely defect solution by excluding any defect solution that is inconsistent with the retrieved freeze frame data.

Where a plurality of defect solutions are potentially associated with the highest priority DTC, the digital signal processor may be further operative to identify an alternative most likely defect solution(s), where the retrieved freeze frame data is inconsistent with the originally identified most likely defect solution.

Where the retrieved freeze frame data is inconsistent with each of the defect solutions associated with the highest priority DTC, an alternate DTC may be identified as the highest priority DTC, whereupon the analysis may be repeated for such alternate DTC.

Where combinations of DTCs are downloaded from the ECU, additional/alternative processing steps may be implemented to identify the most likely defect solution. In one embodiment, combinations of DTCs are stored in the database, with each stored combination being associated with a defect solution. In that embodiment the digital signal processor is operative to identify a most probable defect solution based upon a probabilistic comparison of the combination of received sets of DTCs to the stored combinations of DTCs, wherein the defect solution associated with closest stored combination of DTCs is identified as the most likely defect solution.

In one embodiment the scan tool is operative to identify the most likely defect solution, and/or the highest priority DTC, in response to connecting the scan tool to the vehicle diagnostic port, independent of any further user input.

Where the scan tool is in wireless communication with the ECU, the scan tool may be operative to identify the most likely defect solution, and/or the highest priority DTC, in response to the establishment of a wireless communication link between the scan tool and the ECU, independent of any further user input.

The database may be disposed within the scan tool and/or remotely located relative to the scan tool. Where the database is remotely located, the scan tool may also be configured for wired or wireless communication with the remote database.

In some embodiments the vehicle specification module and/or the database may be implemented to include updatable flash memory units.

The scan tool may also include a display for displaying information such as the received DTCs, the highest priority DTC, the retrieved freeze frame data, the stored freeze frame data, the most likely defect solution, and other information.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE PRESENTLY PREFERRED EMBODIMENT

Figure 1:
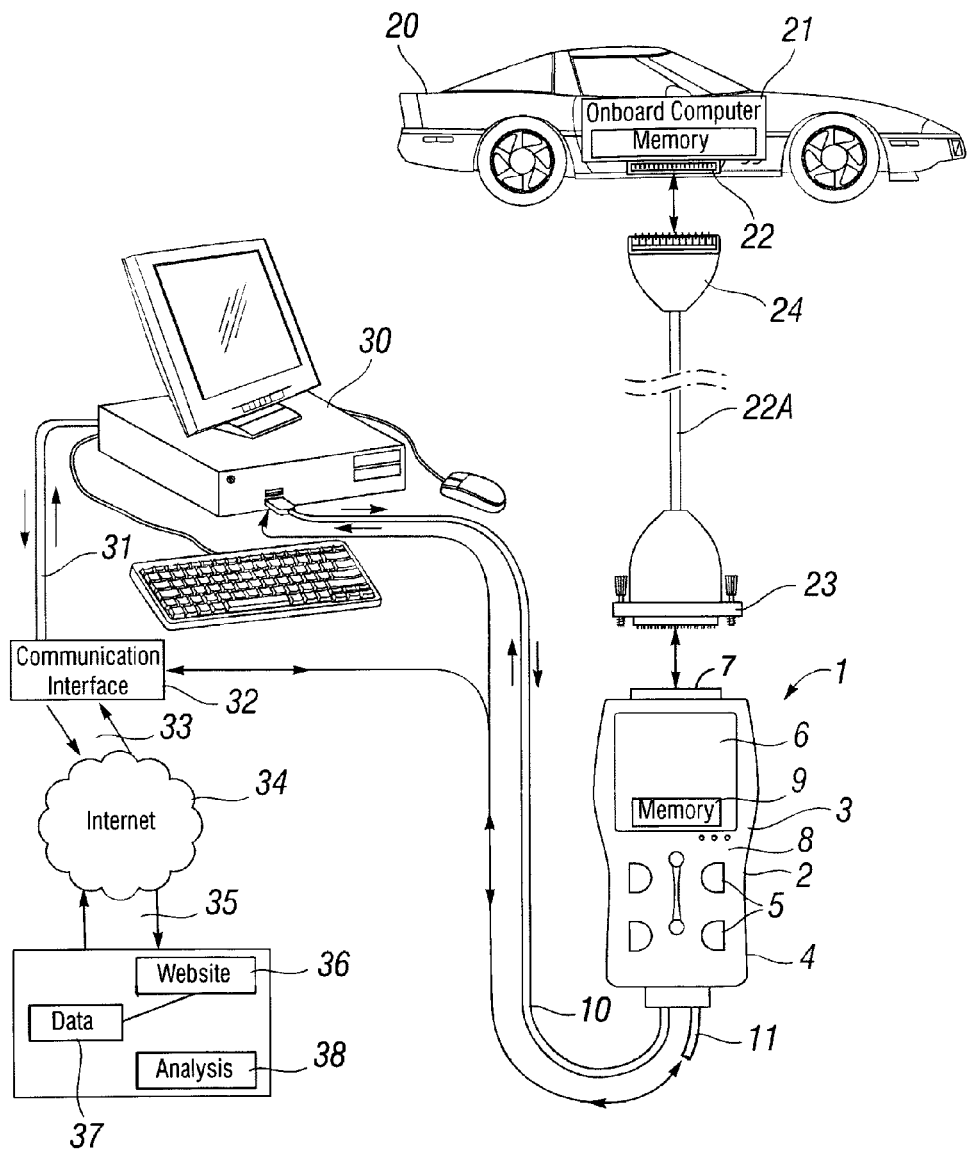
FIG. 1 is an illustration showing how the portable code reader/scanner interfaces to the automobile.

Referring to FIG. 1, the portable code reader/scanner 1 is comprised of a housing 2 enclosing a hollow interior 3. The exterior 4 of the housing is comprised of a keyboard 5 and a display 6 and a sixteen (16) pin connector 7 at one end.

The interior 3 of the portable code reader/scanner is comprised of a processor 8 and memory 9 containing information concerning the vehicle, as well as information identifying possible vehicle defect solutions, indexed to the VIN and the DTCs. There also may be a cable connection 10 or a wireless Bluetooth™ connection 11 to a personal desktop or laptop computer 50. The handheld connector 7 interfaces with an automobile 20 onboard computer 21, either directly or with an intervening vehicle interface cable connector 22A having a handheld portable testing device fitting 23 and a car fitting 24.

In one implementation the personal computer may have a wired or wireless connection 31 to a communication interface 32, which in turn may be connected 33 with the internet 34. The portable code reader/scanner 1 may then be connected, via communication line 35, to website 36 containing data base 37, and is capable of analysis 38 of the data received from the coder reader/scanner 1.

The diagnostic functions of the code reader/scanner 1 may be enhanced by using the resources of a remote database that facilitates processing of the diagnostic data in relation to resources such historical diagnostic information based on prior repairs of other vehicles, information concerning predicted repairs, etc. Communication with the remote database may be via a personal computer, via communication link with a cellphone, or other means.

Figure 2:
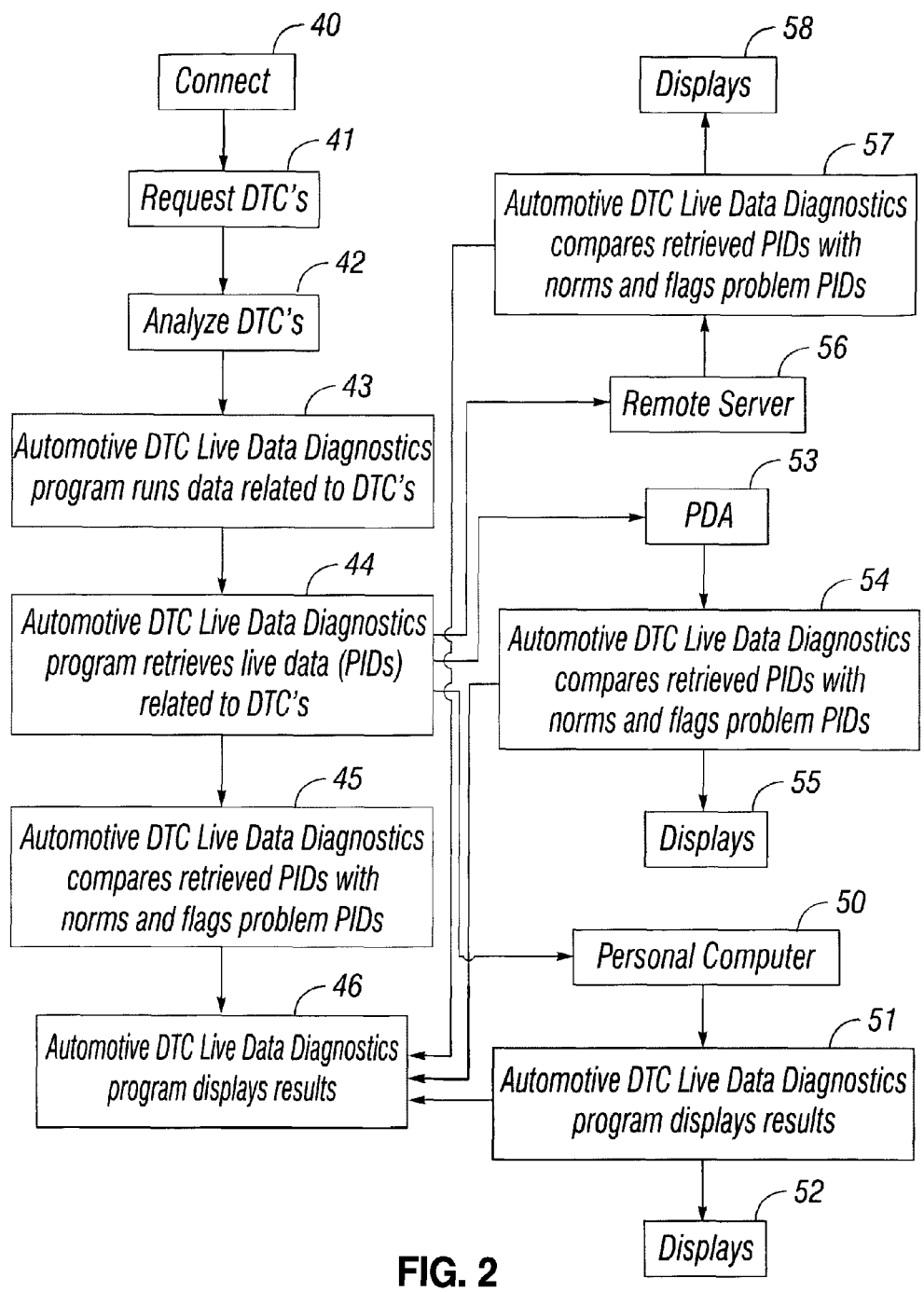
FIG. 2 is a flow diagram illustrating various ways of using the live (in real-time) data analysis program.

In one embodiment, shown at FIG. 2, the portable code reader/scanner 1 is connected to 40 the automobile 20 onboard computer 21. At this point, the diagnostic trouble codes, DTCs, may be requested 41 in order to determine problem areas. The DTCs are then analyzed 42. The portable code reader/scanner 1 is placed in the request live data mode 41 and the automotive DTC live data diagnostics program proceeds to analyze and send commands to the onboard computer 22 requesting specific live data in real-time that were used generate the DTCs 44.

The live data typically includes PIDs and related tests. The live data diagnostic program compares the retrieved PIDs within the ranges of normalcy (norms) within the database and flags the problem PIDs 45, i.e. PIDs that are outside the norms. The results are then displayed 46.

In another embodiment, the portable code reader/scanner 1 is connected to 40 the automobile 20 onboard computer 21. At this point, the diagnostic trouble codes, DTCs, may be requested 41 in order to determine problem areas. The DTCs are then analyzed 42. The portable code reader/scanner 1 is placed in the request live data mode 41 and the automotive DTC data diagnostic program proceeds to analyze and send commands to the onboard computer 22 requesting specific data related to the DTC(s), in real time.

"Related data" that is retrieved may be limited to data that caused a DTC to be generated; data generated at a time proximate time that a DTC was generated; and/or data that is otherwise deemed functionally related to a DTC.

In response to a request for freeze frame data the ECU will typically provide freeze frame data reflecting the vehicle conditions that caused reporting of the DTC which the ECU considers to be the highest priority DTC. That freeze frame data will typically identify the highest priority DTC, either in the data itself, or in a storage location identified by the data. In some cases, additional data may also be retrieved where a comparison with similar stored data is desired. The retrieved DTCs and related data may be sent to a personal computer 50 which contains database information concerning the vehicle automotive DTCs and data diagnostics corresponding to information and programming in the portable coder reader/scanner.

The personal computer 50 uses the automotive DTC data diagnostics program and compares the retrieved data (PIDs) within range of normalcy (norms) and flags the problem PIDs 51. The personal computer 50 may display the PIDs 52 and/or return them to the portable code reader/scanner 1 for display 46.

In another embodiment, the portable code reader/scanner 1 is connected 40 to the automobile 20 onboard computer 21. At this point, the diagnostic trouble codes, DTCs, may be requested 41 in order to determine problem areas. The DTCs are then analyzed 42. The portable code reader/scanner 1 is placed in the request data mode 41 and the automotive DTC data diagnostic program proceeds to analyze and send commands to the onboard computer 22 requesting, for example, freeze frame data. The results of the analysis are sent to a PDA 53 which may contain the same database information concerning the automotive DTC data diagnostics program as the portable code reader/scanner.

The PDA may also use the automotive DTC data diagnostics program to compare the retrieved PIDs to ranges of normalcy (norms), and flag the problem PIDs 55. The PDA 30 may display the PIDs 55 and/or return them to the portable code reader/scanner 1 for display 46.

In a further embodiment, the handheld portable testing device 1 is connected to 40 the automobile 20 onboard computer 21. At this point, the diagnostic trouble codes, DTCs, may be requested 41 in order to determine problem areas. The DTCs are then analyzed 42. The portable code reader/scanner 1 may then be placed in the request data mode 41 and the automobile DTC live data diagnostics program proceeds to analyze and send commands to the onboard computer 22 requesting specific data, such as the data that was used to generate the DTCs 44. The results are sent to a remote server 56, which contains the same database information concerning the vehicle selective data retrieval program as the portable code reader/scanner. The remote server 56 uses the automotive DTC data diagnostics program to compare 57 the retrieved PIDs within ranges of normalcy (norms) 37 and flag 38 the problem PIDs 51. The PDA may display the PIDs 58 and/or return them to the portable code reader/scanner 1 for display 46.

Figure 3:
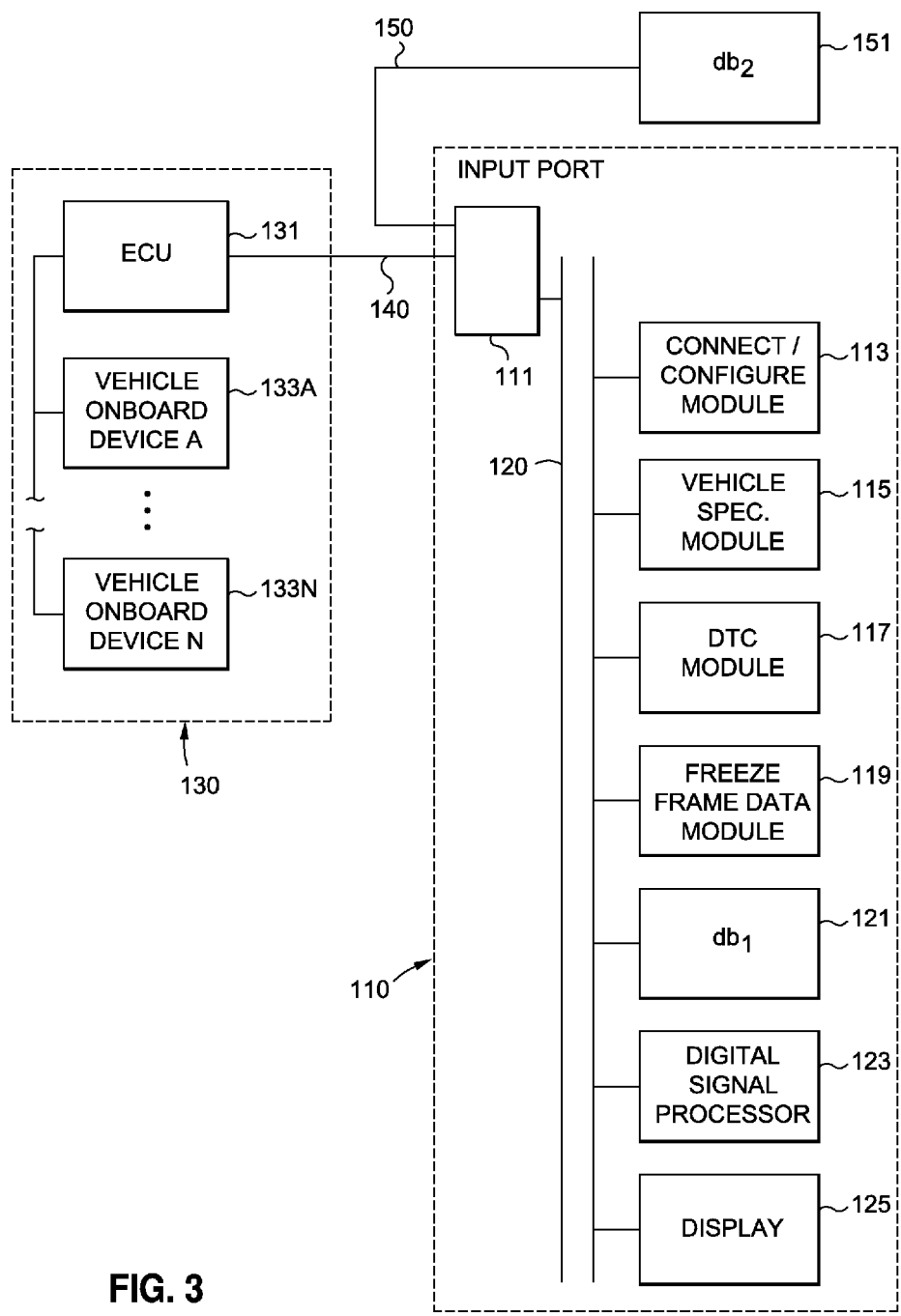
FIG. 3 is a block diagram illustrating an exemplary configuration of a diagnostic scan tool in accordance with the present invention.

FIG. 3 is a block diagram further illustrating an exemplary configuration of a diagnostic scan tool in accordance with the present invention. As shown in FIG. 3 scan tool 110 includes an input port 111 configured to be in electrical communication with ECU 131. The connection 140 between the input port and ECU may be a wired connection through a vehicle diagnostic port, a wireless connection, or some combination thereof.

Scan tool 110 may further include a connect/configure module 113 for establishing a communication link between the scan tool 110 and ECU 131. The connect/configure module 113 may be operative to poll the ECU 131 to determine a proper connect protocol for initiating communication link between the scan tool 110 and the ECU 131. As described below the proper connect protocol can alternatively be derived from scanned VIN information, correlated to a vehicle configuration database Where the ECU is polled, the scan tool 110 may include a vehicle specification module 115 operative to identify a vehicle under test in response to receipt of a vehicle information number (VIN). In one embodiment, the VIN is received from the ECU, in response to polling the ECU, as described above. In another embodiment the VIN is optically scanned on the car, or manually entered into the tool.

The VIN may be used to access information which details the structure and functional operation of the vehicle under test, and facilitates selection of the most likely vehicle defect solution. The vehicle specification module 115 may be used to identify the operating parameters of various vehicle onboard devices, and the operating communication protocols that such devices utilize in communications with the ECU, PIDs, etc.

As those of ordinary skill will recognize, a polling process may be to derive various communications protocols used by the ECU. However, such a polling process may introduce a substantial delay in the operation of the scan tool. Moreover, repeating the polling process each time the scan tool desires to communicate with a different vehicle onboard device introduces a further delay in the operation of the scan tool. In accordance with the present invention the vehicle specification module can use the VIN, which retrieved from the ECU or otherwise obtained, to access relevant stored information identifying the communication protocols and other operating parameters applicable to the various vehicle onboard devices. The vehicle specification module then configures the scan tool to communicate with those devices, as desired, without a need for repeating the polling process.

The VIN information may be derived using an optical scanner user input. As indicated above, the VIN information may then be used to derive the proper ECU protocol, device protocols, PID set, $PID_{min/nom/max}$ and other vehicle configuration data.

The scan tool 110 further includes a digital trouble code module 117 for receiving digital trouble codes (DTC) from the ECU. While contemporary ECUs are not known to prioritize DTC's output from the ECU, at least some ECUs are operative to inferentially identify the highest priority DTC, by the ECU's selection of freeze frame data output to the tool. Thus, while the ECU does not specifically identify the highest priority DTC to the tool, the highest priority DTC can be identified or derived by the tool from an analysis of the freeze frame data, i.e. identifying the DTC associated with that freeze frame data. Identification of the highest priority DTC may then be used to derive the most likely defect in a vehicle under test. The ECU's selection of freeze frame data, and therefor the identification of the highest priority DTC may change as additional DTC's are retrieved and reported by the ECU. Moreover, as described below, the present invention may change the identification of the highest priority DTC based on an evaluation of other diagnostic data and historical/reference data.

The scan tool 110 may further include a database 121, i.e. $db_1$, listing possible defect solutions indexed to the DTCs and the VIN. The database may be configured for a particular vehicle and include at least one vehicle defect solution indexed to a DTC generated by a specific make/model/year/etc. vehicle. More commonly, the database may include multiple defect solutions associated with a single DTC, for the same vehicle. In such cases, live data or reference data may be used to prioritize among multiple possible solutions.

A digital processor is provided in the scan tool 110, in electrical communication with the ECU 131, the connect/configure module 113, the vehicle specification module 115, the DTC module 117, the freeze frame data module 119, the database 121, and display 125. The digital signal processor is operative, inter alia, to regulate selection of a most likely defect solution associated with the VIN, the highest priority DTC and, in some cases, the retrieved freeze frame data or live data.

The database 121 may further include nominal freeze frame data, indexed to the vehicle onboard devices. The digital signal processor 123 may be configured to compare the retrieved freeze frame data to the corresponding nominal freeze frame data, to identify any anomalies therebetween. Such anomalies may be useful to confirm whether or not the vehicle onboard device from which the received freeze frame data originates is defective. The database 121 may further be configured to include freeze frame data associated with the possible defect vehicle solutions. In such embodiment, the digital signal processor 123 may be operative to compare the retrieved freeze frame data to the stored nominal freeze frame data, or freeze frame data corresponding with the most likely defect solution to confirm the most likely defect solution, or to indicate that the defect solution identified as the most likely defect solution is actually not the most likely defect solution. In that case, the next most likely defect solution may be selected as the defect solution, or an alternate DTC may be identified as the highest priority DTC, where after an evaluation of the most likely defect solution begins again.

As it will be apparent to those of ordinary skill in the field, the specific steps in implementing the functionalities described above may be varied without departing from the scope and spirit of the present invention. As such, the various stored data, e.g. VIN information, protocol information, possible defect solutions, nominal freeze frame data, and/or freeze frame data corresponding with possible defect solutions may be stored in a common database, such as database 121, an associated personal computer, or distributed in different modules. Similarly, such information may be stored in the remote database 151, accessible by communication link 150, which may be hard wired and/or wireless. The database 151, i.e. $db_2$, may be located on a website accessible by the scan tool, either by a wire connection or linkage through a wireless network, such as a cellphone network or satellite communication system.

In some implementations, the scan tool functions may be automatically implemented in response to connecting the tool to the vehicle diagnostic port, or otherwise establishing a communication link between the scan tool and the ECU. Where the particular ECUs is operative to output prioritized DTC's (e.g. based on the sequence generated) and capture related live data, the scan tool may be operative to autonomously identify the highest priority DTC, evaluate the freeze frame data, and derive the most likely defect solution in response to connecting the tool to the vehicle diagnostic port, or otherwise establishing a communication link between the scan tool and the ECU, independent of any further diagnostic processes of user input.

In one embodiment the database 121 is implemented as an updatable flash memory unit. The remote database 151 may similarly include an updatable flash memory unit.

In one embodiment the database 121, and/or database 151, may include a historical database having stored combinations of DTCs, along with the particular defect solution identified for each stored combination of DTCs. The scan tool 110 may be configured to implement a probabilistic comparison of the received combinations of DTCs to stored combinations of DTCs, to identify the highest stored combination, i.e. the highest ranked stored combinations of DTCs, even if no individual DTC is identified as the highest priority DTC. The defect solution associated with the highest ranked stored combination of DTCs may be identified as the most likely defect solution. Such a probabilistic comparison may be used to initially generate a most likely solution, to confirm a prior identification of the most likely defect solution, to initially provide a most likely defect solution, or as back-up technique, e.g. where none of the previously identified defect solutions appear to be consistent with the retrieved freeze frame data or other diagnostic data received from the ECU.

A process of implementing such a probabilistic analysis is further described in U.S. patent application Ser. No. 12/715,181, referenced above, the contents of which are incorporated herein by reference.

Figure 4:
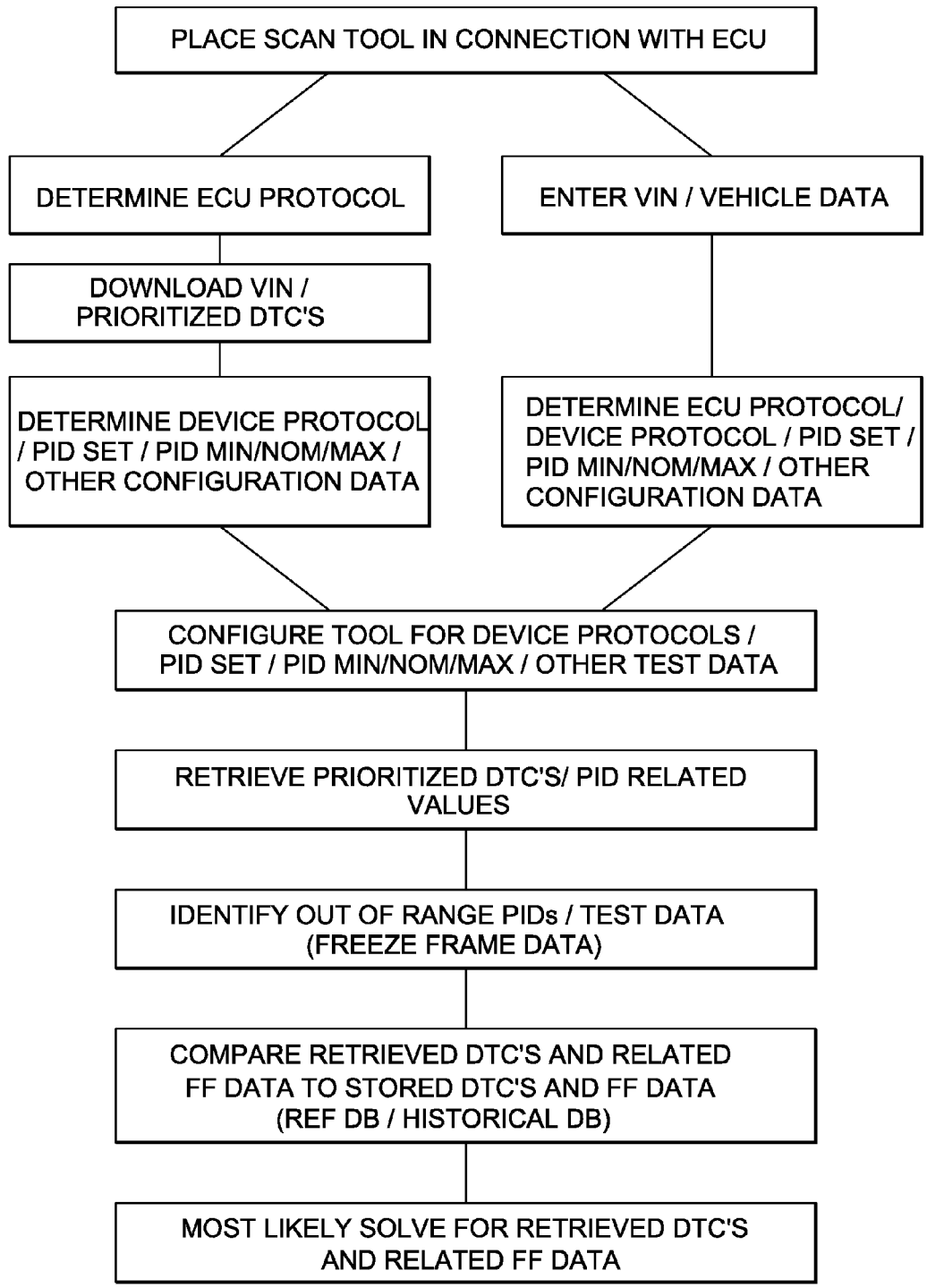
FIG. 4 is a flow diagram indicating exemplary processes for implementing diagnostic functions in accordance with the present invention.

Referring to FIG. 4, the description of an exemplary process for implementing the present invention is provided. In accordance with process, the scan tool is initially placed in communication with the ECU. In one implementation, the scan tool polls the ECU to determine the ECU protocol. Once the communication is initiated using the identified ECU protocol, the VIN and the DTCs may be downloaded from the ECU. The VIN information may be used to derive additional configuration data, such as the protocol of the individual electronic devices, the PID set, the $PID_{min/nom/max}$, and other configuration data.

The tool may then be configured and related PID values and other test data retrieved. Out of range PIDs and live data (collectively freeze frame data) may be identified from comparison to corresponding reference data. The most likely solution may be derived from the VIN, the highest priority DTC and the analysis of PID values and other data, as described above.

In an alternate implementation, the VIN may be derived independent of communication with ECU, such as by optically scanning the VIN information or user input of the VIN information, or make/model/year information. That information may be used to derive configuration data, by use of a database indexed to the VIN and the tool may then be configured.

As noted above, the most likely solution may then be derived using the techniques described above.

In another implementation, the most likely solution may be derived (e.g. at a remote database) by comparison of the combination of DTCs to stored combinations of DTCs, where in the stored combinations of DTCs are associated with historically identified solutions. The most likely solution may be identified as that solution which corresponds to the highest ranked combination of stored DTCs. Freeze frame data may be used to confirm that solution, and/or to differentiate among multiple possible solutions associated with a stored combination of DTCs.

Additional data may also be considered in identifying the most likely solution. For example, the reference database may be configured to include vehicle historical data, data regarding the location/climate in which the vehicle operates, vehicle mileage data, and/or predicted repairs/replacements. For example, such data may include a list of defects predicted for a specific vehicle, associated with specific mileage ranges. As a vehicle approaches or exceeds the mileage at which such predicted defects may occur, those mileage based predicted defects may be given higher priority in evaluating the most likely solution. Similarly, where certain defects are likely to arise as a result of operation in extreme climates, those defects may be given priority where the information confirms that such climate considerations are applicable to the vehicle under test.

As will be recognized by one skilled in the art, the above programming examples are presented as one method of programming. Other programming techniques may be utilized to implement the described diagnostic methods.

What is claimed is:

1. A diagnostic scan tool comprising:
   a) a connect/configure module for establishing a communication link between the scan tool and a vehicle electronic control unit (ECU);
   b) a vehicle specification module operative to identify operating parameters of a vehicle under test in response to receipt of a vehicle identification number (VIN) from the ECU;
   c) a trouble code module for receiving digital trouble codes (DTC's) from the ECU;
   d) a database disposed within the scan tool, the database including a listing of possible vehicle defect solutions indexed to DTC's and the vehicle operating parameters;
   e) a freeze frame data module for retrieving freeze frame data from the ECU, the retrieved freeze frame data being representative of the operation of a vehicle onboard device(s) associated with a DTC identified as the highest priority DTC; and
   f) a digital signal processor in electrical communication with the ECU, the vehicle specification module, the database, the DTC module and the freeze frame data module, the digital signal processor being operative to derive the highest priority received DTC from analysis of the retrieved freeze frame data, and to regulate selection of a most likely vehicle defect solution associated with the vehicle operating parameters, and the highest priority received DTC.

2. The scan tool as recited in claim 1, wherein the retrieved freeze frame data is representative of the electrical signals that caused the highest priority DTC to be generated.

3. The scan tool as recited in claim 2, wherein the database further includes nominal freeze frame data, indexed to the vehicle onboard devices, and wherein the digital signal processor is operative to compare the retrieved freeze frame data to the corresponding stored nominal freeze frame data to identify any anomaly(s) therebetween.

4. The scan tool as recited in claim 1, wherein the database further includes stored freeze frame data associated with the possible vehicle defect solutions, and wherein the digital signal processor is operative to compare the retrieved freeze frame data to the corresponding stored freeze frame data associated with the most likely defect solution to identify any anomaly(s) therebetween.

5. The scan tool as recited in claim 4, wherein the digital signal processor is further operative to regulate selection of the most likely defect solution by identifying an alternative most likely solution when the stored freeze frame data associated with the most likely defect solution is beyond tolerance of the corresponding retrieved freeze frame data.

6. The scan tool as recited in claim 5, wherein the digital signal processor is further operative to exclude a retrieved DTC from being identified as the highest priority DTC where the stored freeze frame data associated with each defect solution associated with the highest priority DTC is beyond tolerance of the corresponding retrieved freeze frame data.

7. The scan tool as recited in claim 1, further includes a display operative to display at least one of the received DTC's, at least a portion of the retrieved freeze frame data, and the most likely defect solution.

8. The scan tool as recited in claim 1, wherein the scan tool is operative to identify the highest priority DTC in response to establishing a communication link between the scan tool and the ECU, independent of any further user input.

9. The scan tool as recited in claim 1, wherein the scan tool is operative to identify the most likely defect solution in response to establishing a communication link between the scan tool and the ECU, independent of any further user input.

10. The scan tool as recited in claim 1, wherein the scan tool is configured for communication with a remote database.

11. The scan tool as recited in claim 4, wherein the database includes an identification of communication protocols between the ECU and the vehicle onboard devices, indexed to the vehicle operating parameters.

12. The scan tool as recited in claim 1, wherein the digital signal processor is operative to alternately identify the most likely defect solution based on a ranked comparison of the received plurality of DTC's to stored combinations of DTC's, each stored combination of DTC's being associated with a particular defect solution, the defect solution that is associated with the highest priority DTC and with the highest ranked stored combination of DTC's being identified as the most likely defect solution.

13. The scan tool as recited in claim 1, wherein the database includes an updatable flash memory unit.

14. The scan tool as recited in claim 1, wherein the said vehicle specification module is further operative to identify communication protocols between the ECU and a plurality of vehicle onboard device(s) from a stored protocol information database on the tool, indexed to the vehicle operating parameters.

15. The scan tool as recited in claim 1, wherein the connect/configure module is operative to poll the ECU to determine a proper connect protocol.

16. A method of diagnosing vehicular defects with a diagnostic device comprising:
    a) placing the device in communication with a vehicle electronic control unit (ECU);
    b) configuring the device in response to vehicle operating parameters derived from a vehicle identification number (VIN);
    c) receiving digital trouble codes (DTC's) and freeze frame data from the ECU, the freeze frame data being representative of the operation of a vehicle onboard device(s) associated with a DTC identified as the highest priority DTC;
    d) deriving the highest priority DTC solely from analysis of the freeze frame data; and
    e) identifying a most likely defect solution based on the vehicle operating parameters and the highest priority DTC.

17. A process for diagnosing a vehicular defect with a new scan tool comprising:
    a) placing the scan tool in communication with a vehicle electronic control unit (ECU);
    b) configuring the tool in response to information derived from a vehicle identification number (VIN);
    c) receiving digital trouble codes (DTC's) and freeze frame data from the ECU;
    d) deriving the highest priority DTC from analysis of the freeze frame data;
    e) identifying a most likely defect solution based on the VIN and the highest priority DTC;
    f) configuring the scan tool to retrieve freeze frame data associated with the mostly likely defect solution;
    g) comparing the retrieved freeze frame data to stored freeze frame data associated with the most likely solution;
    h) determining whether the retrieved freeze frame data is within tolerance of the stored freeze frame data associated with the most likely solution; and
    i) confirming the most likely solution when the retrieved freeze frame data is within tolerance of the stored freeze frame data associated with the most likely solution.

18. The process of diagnosing a vehicular defect as recited in claim 17, further comprises the steps of:
    j) where the retrieved freeze frame data is outside tolerance of the stored freeze frame data associated with the most likely solution, then selecting an alternate most likely solution corresponding to the highest priority DTC;
    k) configuring the scan tool to retrieve freeze frame data associated the with the alternate most likely defect solution; and
    l) confirming the alternate most likely defect solution when the retrieved freeze frame is within tolerance of the stored freeze frame data associated with the alternate most likely defect solution.

19. The process of diagnosing a vehicular defect as recited in claim 18, further comprises the steps of:
    m) where the retrieved freeze frame data associated with the alternate most likely solution is outside tolerance of the stored freeze frame data associated with the alternate most likely solution, and an alternate most likely solution for the highest priority DTC is not available, then selecting an alternate highest priority DTC; and
    n) identifying a most likely defect solution indexed by the and the alternate highest priority DTC.

20. A diagnostic scan tool comprising of:
    a) a connect/configure module for establishing a communication link between the scan tool and a vehicle electronic control unit (ECU);
    b) a vehicle specification module operative to identify operating parameters of a vehicle under test in response to receipt of a vehicle identification number (VIN) from the ECU;
    c) a trouble code module for receiving digital trouble codes (DTC's) from the ECU;
    d) a database disposed within the scan tool, the database including a listing of possible vehicle defect solutions indexed to DTC's and the vehicle operating parameters;
    e) a freeze frame data module for retrieving freeze frame data from the ECU, the retrieved freeze frame data being representative of the operation of a vehicle onboard device(s) associated with a DTC identified as the highest priority DTC;
    f) a digital signal processor in electrical communication with the ECU, the vehicle specification module, the database, the DTC module and the freeze frame data module, the digital signal processor being operative to derive the highest priority received DTC from analysis of the retrieved freeze frame data, and to regulate selection of a most likely vehicle defect solution associated with the vehicle operating parameters and the highest priority received DTC;
    g) wherein the database further includes stored freeze frame data associated with the possible vehicle defect solutions, and wherein the digital signal processor is operative to compare the retrieved freeze frame data to the corresponding stored freeze frame data associated with the most likely defect solution to identify any anomaly(s) therebetween; and
    h) wherein the digital signal processor regulates selection of the most likely solution by excluding any possible defect solution for which the stored freeze frame data is beyond tolerance of the corresponding retrieved freeze frame data.

21. A method of diagnosing vehicular defects with a scan tool comprising:
   a) placing the scan tool in communication with a vehicle electronic control unit (ECU);
   b) configuring the tool in response to vehicle operating parameters derived from a vehicle identification number (VIN);
   c) receiving digital trouble codes (DTC's) and freeze frame data from the ECU;
   d) deriving the highest priority DTC from analysis of the received freeze frame data;
   e) identifying a most likely defect solution based on the vehicle operating parameters and the highest priority DTC;
   f) configuring the scan tool to retrieve freeze frame data associated with the mostly likely defect solution;
   g) comparing the retrieved freeze frame data to stored freeze frame data associated with the most likely solution;
   h) determining whether the retrieved freeze frame data is within tolerance of the stored freeze frame data associated with the most likely solution;
   i) confirming the most likely solution when the retrieved freeze frame data is within tolerance of the stored freeze frame data associated with the most likely solution;
   j) where the retrieved freeze frame data is outside tolerance of the stored freeze frame data associated with the most likely solution, then selecting an alternate most likely solution corresponding to the vehicle operating parameters and the highest priority DTC;
   k) configuring the scan tool to retrieve freeze frame data associated the with the alternate most likely defect solution; and
   l) confirming the alternate most likely defect solution when the retrieved freeze frame data is within tolerance of the stored freeze frame data associated with the alternate most likely defect solution.

22. The scan tool as recited in claim 1, wherein the database further lists vehicle specific mileage based predicted defects, and wherein the digital signal processor is further operative to retrieve vehicle mileage data from the ECU and to evaluate the vehicle mileage data and the vehicle specific mileage based predicted defects in the selection of the most likely vehicle defect solution.

23. The scan tool as recited in claim 1, wherein the digital signal processor is operative to identify the highest priority DTC independent of any need to compare the received DTCs.

24. The scan tool as recited in claim 1, wherein the database further includes a stored nominal freeze frame data, and wherein the digital signal processor is operative to compare the retrieved freeze frame data to the corresponding stored nominal freeze frame data, to identify an anomaly(s) therebetween.

25. The scan tool as recited in claim 24, wherein the digital signal processor regulates the selection of the most likely solution by excluding any possible defect solution for which the freeze frame data associated with the possible defect solution is within tolerance of the corresponding stored nominal freeze frame data.

26. The process for diagnosing a vehicle defect as recited in claim 16, further comprising the step of receiving vehicle mileage data from the ECU and wherein the step of identifying a most likely defect solution is also based on consideration of the vehicle mileage data and vehicle specific mileage based predicted defects.

27. The diagnostic tool as recited in claim 1, wherein the digital signal processor is operative to derive the highest priority DTC independent of any predetermined prioritization of vehicle systems.

28. The diagnostic tool as recited in claim 20, wherein the digital signal processor is operative to derive the highest priority DTC independent of any predetermined prioritization of digital DTCs.

29. The diagnostic tool as recited in claim 1, wherein the retrieved freeze frame data includes PIDs, wherein the database includes stored PID norm ranges, and wherein the digital signal processor is operative to compare the retrieved PIDs with the stored PID norm ranges to identify an anomaly(s) therebetween.

30. A diagnostic device comprising:
   a) a connect/configure module for establishing a communication link between the diagnostic device and a vehicle electronic control unit (ECU);
   b) a vehicle specification module operative to identify operating parameters of a vehicle under test in response to receipt of a vehicle identification number (VIN) from the ECU;
   c) a trouble code module for receiving digital trouble codes (DTC's) from the ECU;
   d) a freeze frame data module for retrieving freeze frame data from the ECU, the retrieved freeze frame data being representative of the operation of a vehicle onboard device(s) associated with a DTC identified as the highest priority DTC;
   e) a digital signal processor in electrical communication with the ECU, the vehicle specification module, a diagnostic database, the DTC module and the freeze frame data module, the digital signal processor being operative to derive the highest priority received DTC from analysis of the retrieved freeze frame data, and to regulate selection of a most likely vehicle defect solution associated with the vehicle operating parameters, and the highest priority received DTC; and
   f) wherein the database includes a listing of possible vehicle defect solutions indexed to DTC's and the vehicle operating parameters.

31. The diagnostic device as recited in claim 30, wherein the database is disposed within the diagnostic device.

32. The diagnostic device as recited in claim 30, wherein the database is remotely located relative to the diagnostic device and the ECU.

33. The diagnostic device as recited in claim 30, wherein the diagnostic device is configured for communication with the database.

* * * * *